United States Patent Office 2,827,473
Patented Mar. 18, 1958

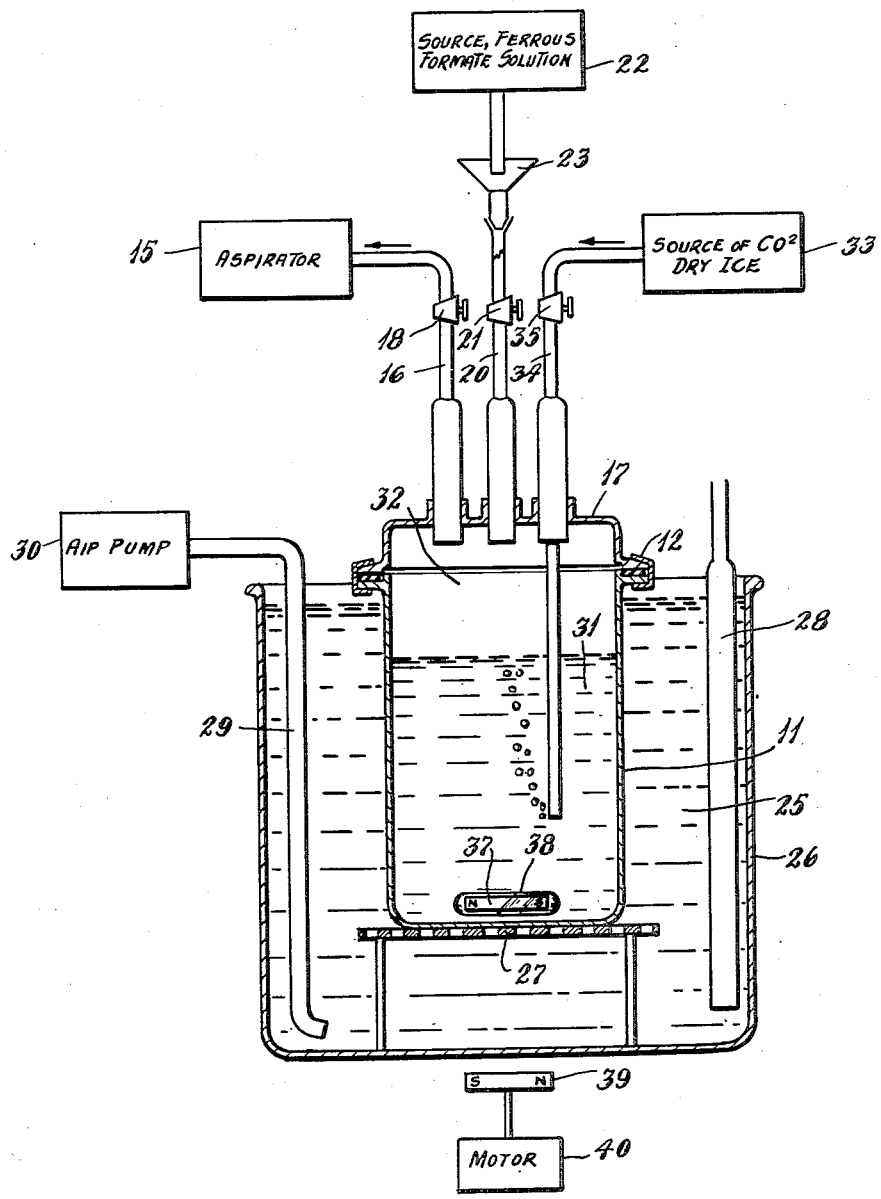

2,827,473

PROCESS FOR PRODUCING GRANULAR MATERIALS FOR MAGNETS

Alan D. Franklin, Glenside, and Phyllis A. Parkin, Melrose Park, Pa., assignors, by mesne assignments, to the United States of America as represented by the Secretary of the Navy Application March 31, 1955, Serial No. 498,457

1 Claim. (Cl. 260—439)

The present invention pertains to the art of producing permanent magnets from comminuted magnetic materials, by the process of sintering, for example. The invention is directed to the method of preparing ferrous formate as an intermediate raw material, from which the magnetic material is produced that constitutes the finished magnet.

In its essential particularly, the invention consists of providing a formic-acid solution of iron in a precipitation chamber, in which the solution is heated in a partial vacuum that evaporates water from the solution, driving off the evaporated water with carbon dioxide, and adding a solution of formic acid to the resultant precipitate to dissolve ferric formate. The ferric formate is discarded in solution with the formic acid. The resultant ferrous formate of the precipitate is in purified form. It is dried, and may be stored for further processing when it is needed.

Ferrous formate is desired because it readily produces the proper particle size in the oxide of iron, which is produced by decomposing the ferrous formate thermally. This particle size in the oxide form of the iron determines the desired particle size in the resultant iron powder constituting the final product, the iron powder being produced by appropriate chemical means that reduces the oxide. The oxide derived from the purified ferrous formate is more readily reducible than other oxides of iron, especially those containing quantities of ferric iron. The process of the present invention inhibits oxidation of ferrous formate to the ferric state. By means of the process of the present invention, ferrous formate is produced with a ferric content less than 1% relative to the ferrous iron.

The process of the present invention is adaptable to the preparation of other similar raw materials from which fine-particle permanent magnets are made, such as ferrous and cobaltous oxalates, cobaltous formate, etc., and various mixtures of these.

Apparatus suitable for the process of the present invention is disclosed in the accompanying drawing, comprising a single figure.

A ferrous formate solution is prepared by dissolving carbonyl iron in an aqueous solution of formic acid, the carbonyl iron containing about 98% by weight of iron. The concentration of formic acid in the original solution is adjusted to provide a resultant pH value of from two to three after the iron has dissolved, which prevents oxidation of the solution. The resultant solution may be exposed to the atmosphere safely for several hours.

Precipitation chamber 11 is provided, which is sealed air-tight, by means of clamping band 12 for example. Chamber 11 is evacuated to a pressure lower than atmospheric by any suitable mechanism, such as the aspirator 15, which is connected with the chamber through fluid line 16 projected downwardly through top wall 17 of the chamber into its interior. Pet cock 18, in line 16, is adjustable to permit evacuation of chamber 11 by aspirator 15 being operated.

The ferrous formate solution enters precipitation chamber 11 through fluid line 20, under control of pet cock 21. The solution from source 22 is deposited in filter 23, which removes any solid matter that is present, and is drawn through the filter into chamber 11 when pet cock 21 is opened, by operation of the partial vacuum produced in the chamber by means of aspirator 15.

Precipitation chamber 11 is held at a constant temperature, and for the purpose is immersed in water 25 within container 26 to a predetermined depth as shown. Chamber 11 rests on a rack or trivet 27 inside container 26, and thereby is located at the desired depth. Water 25 is heated by any suitable means. In the disclosed embodiment, knife-blade heater 28 is provided, which is submerged in water 25 as shown. Air is bubbled into water 25 through duct 29, by means of pump 30, and this distributes the heat that is supplied by heater 28 uniformly throughout container 26.

Aspirator 15 operates to keep the pressure in chamber 11 below atmospheric. The application of heat from water bath 25 to the solution 31 in a partial vacuum causes water to evaporate, which is drawn out of space 32 above the liquid level by means of the aspirator. Ferrous formate precipitates out of solution 31, and settles to the bottom in chamber 11.

Carbon dioxide is supplied from a source of Dry Ice 33, and is fed into solution 31 through fluid line 34, under control of pet cock 35. Carbon dioxide operates to sweep evaporated water vapor out of solution 31.

The temperature of solution 31 is not critical. A temperature of 60° C. has been found satisfactory, and should be maintained constant because it represents a balance between the rate of evaporation and the rate of oxidation due to small amounts of air brought into the solution 31 with the $CO_2$, through fluid line 34.

The solution is stirred continuously during the operation, to produce a finely divided granular product. The specific stirring mechanism of the disclosure comprises a bar magnet 37 enclosed and sealed in glass tube 38. The weight of glass tube 38 containing magnet 37 is preferably controlled to slightly more than its liquid displacement in solution 31. Permanent magnet 39 is rotated in a horizontal plane by motor 40, which is mounted to position magnet 39 below water bath 25 located close to glass tube 38 containing permanent magnet 37, and magnet 37 is rotated by rotation of magnet 39. Motor 40 is operated to rotate magnet 37 about 100 R. P. M.

Some oxidation occurs during precipitation. Oxidation first becomes noticeable when the pale green color of the ferrous formate solution becomes olive colored, caused by the presence of yellow ferric iron. Occasionally, ferric formate, which is orange-brown, precipitates in small quantities.

When chamber 11 is almost dried, it may be filled with formic-acid solution at a pH of about two. The ferric formate is much more soluble in the formic acid solution than is ferrous formate, and is dissolved out of the precipitate by the formic acid. After several hours, the orange-brown ferric formate disappears from the precipitate. The formic acid solution then is drawn off of the precipitate, and is discarded. The loss of ferrous formate in the discarded formic-acid solution is not prohibitive because the solubility of ferric formate is much greater.

More solution of ferrous formate, prepared by dissolving carbonyl iron in formic acid as described hereinbefore, is added to precipitation chamber 11 through filter 23 and fluid line 20 when the precipitate in the chamber is almost dry and the process of precipitation is continued in the manner described. When a sufficient quantity of precipitated ferrous formate has accumulated in chamber 11, it is permitted to remain until it is quite dry. It is then transferred to a desiccator where it is stored as raw material, and from which it is taken when it is desired to continue the process of producing iron powder from which permanent magnets are made.

The accompanying disclosure is one practical embodiment of the invention. The scope of the invention is determined by the accompanying claim.

We claim:

In the process of producing magnets of comminuted magnetic material, the step of producing ferrous formate which comprises dissolving iron in formic acid, transferring the formic-acid solution of iron through a filter into a precipitation chamber, heating the solution in the precipitation chamber in a partial vacuum and in the presence of carbon dioxide, drawing evaporated liquid out of the precipitation chamber, adding formic-acid solution to the precipitation chamber to dissolve ferric formate from the precipitate and discarding the resultant solution, stirring the solution in the precipitation chamber continuously, and drying the resultant precipitate of ferrous formate.

References Cited in the file of this patent

UNITED STATES PATENTS

| | | |
|---|---|---|
| 2,576,072 | Johnson | Nov. 20, 1951 |
| 2,688,032 | Kopelman | Aug. 31, 1954 |